United States Patent Office 3,459,333
Patented Aug. 5, 1969

3,459,333
LIQUID-DISPENSING APPARATUS
Samuel Inglefield, Runcorn, England, assignor to Imperial Chemical Industries Limited, London, England, a corporation of Great Britain
Filed Jan. 18, 1968, Ser. No. 698,754
Claims priority, application Great Britain, Jan. 27, 1967, 4,208/67
Int. Cl. B67d 5/08; G01f 11/00
U.S. Cl. 222—64     5 Claims

ABSTRACT OF THE DISCLOSURE

Liquid-dispensing apparatus for dispensing a predetermined volume of liquid by application of gas pressure includes the combination of (a) a sample compartment contained within a first chamber, with the sample compartment having a delivery outlet for delivering a predetermined volume of liquid from the sample compartment, (b) a second chamber for dispensing liquid into the sample compartment of the first chamber, conduit means for returning overflow liquid from the sample compartment to the second chamber, and (c) means for applying a relatively high gas pressure to the first chamber in which the sample compartment is located. The apparatus may be used with gas chromatography equipment for dispensing a sample of liquid into a vaporizer associated with the chromatography equipment.

---

This invention relates to a liquid dispenser.

In a wide variety of manufacturing and testing processes it is often desirable to provide an apparatus for dispensing a predetermined volume of liquid at desired intervals. Known types of liquid dispensers involve the use of pumps which may be operated by means of gears or diaphragms. The use of valves or other moving parts introduces problems of corrosion and/or leakage and it is desirable in many applications to provide means of dispensing liquids whereby the liquid to be dispensed does not come into contact with such mechanical components. It is further often desirable that the dispenser may be automatically recharged after delivery.

According to the present invention there is provided a liquid dispenser comprising a sample compartment within a chamber, the sample compartment being provided with a delivery outlet and being adapted to be filled with liquid to a predetermined level, and the said chamber being adapted to allow the establishment therein of a gas pressure whereby liquid is dispensed from the sample compartment.

A preferred form of the apparatus comprises a sample compartment within a first chamber, the said sample compartment being adapted to receive liquid from a second chamber and to be filled to a predetermined level therewith and a conduit being provided for returning to the second chamber liquid overflow from the sample compartment.

In one embodiment of the preferred form of the apparatus, the gas pressure established within the first chamber serves not only to dispense liquid from the sample compartment but also to recharge the second chamber with liquid. Thus the liquid may be dispensed from the sample compartment upon application within the first chamber of a gas pressure higher than that prevailing in the second chamber, the said application of pressure also serving to return to the second chamber liquid overflowed from the sample compartment.

In an alternative embodiment of the preferred form of the apparatus, the stage of recharging the second chamber with liquid overflowed from the sample compartment is separated from the stage of dispensing liquid from the sample compartment. Thus the apparatus may be adapted to allow the establishment, during the dispensing stage, of a gas pressure within the second chamber at least equal to that in the first chamber, and to allow the subsequent establishment within the second chamber of a pressure lower than that prevailing in the first chamber, thereby recharging the second chamber with liquid overflowed from the sample compartment. Conveniently the necessary pressure within the first chamber at the dispensing stage may be achieved by the application of gas pressure within the second chamber, communication between the two chambers allowing the applied pressure to be transmitted to the first chamber.

After the stage of recharging the second chamber with liquid, either embodiment of the preferred form of the apparatus may be arranged to allow equalization of pressure in the first and second chambers at a pressure which is equal to or less than the pressure prevailing at the discharge end of the delivery outlet, while maintaining the pressure in the first chamber at a pressure which is higher than that prevailing in the second chamber at all stages of the said equalization of pressure. This prevents the sample compartment from receiving liquid from the second chamber until the pressures in the first and second chambers have been equalized and thus prevents any further dispensing of liquid from the sample compartment during the equalization stage.

The liquid dispenser finds particular application in gas chromatography, especially in preparative-scale gas chromatography wherein predetermined volumes of liquid are required to be automatically injected into the vaporizer at intervals over an extended period. The dispensing of the liquid may be actuated, for example, by the receipt of a signal from the detector of a gas chromatographic apparatus.

The invention is further illustrated, but not limited, by the embodiment which will now be described with reference to the accompanying drawings.

Figure 1:
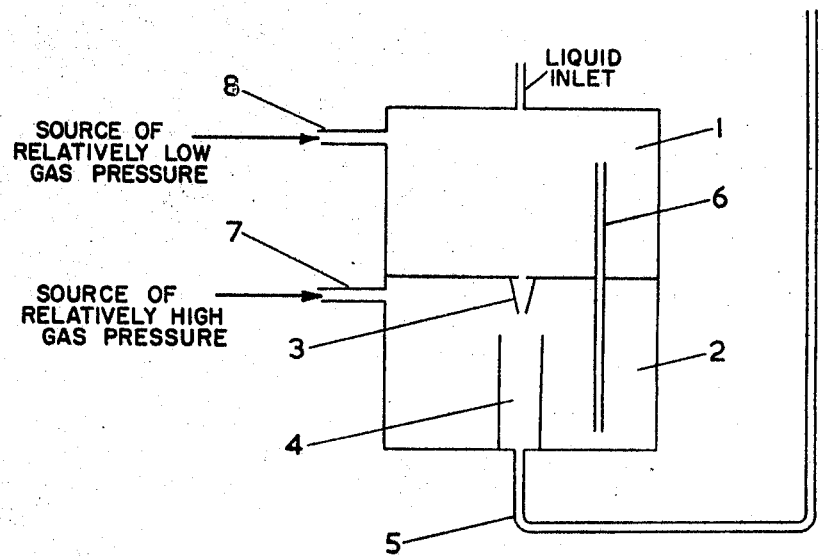
FIGURE 1 is a diagrammatic cross-section of the apparatus.

An upper chamber 1 communicates with a lower chamber 2 by means of an orifice 3. A sample compartment 4 receives liquid flowing through the orifice 3 and communicates at its lower end with a delivery capillary tube 5 through which the liquid sample is dispensed. The liquid overflowing from the sample compartment 4 is received in the lower portion of the lower chamber 2. A return conduit 6 is provided to allow return of overflowed liquid to the upper chamber 1.

Pressure is applied to the lower chamber 2 via the side-arm 7 and the upper chamber 1 is connected to a source of relatively low pressure via the side-arm 8. In operating the apparatus, the upper chamber 1 is charged with liquid through an inlet port (not shown) to a level below the top of conduit 6, the whole of the apparatus being at atmospheric pressure; the liquid therefore flows through the orifice 3 to fill the sample compartment 4, the excess liquid overflowing into the lower part of the lower chamber 2. When it is desired to dispense a sample, connections are made via side-arms 7 and 8 to the sources of relatively high pressure and relatively low pressure respectively; the sample is thus dispensed via the delivery tube 5 and the overflowed liquid is returned to the upper chamber 1 via conduit 6. The relatively high pressure maintained in the chamber 2 prevents flow of liquid through the orifice 3 during the dispensing operation. Subsequently the pressures in the chambers 1 and 2 are equalized thus allowing liquid to flow through the orifice 3 and the cycle of operations is repeated. The pressures may be controlled so that the pressure in the lower chamber 2 always exceeds the pressure in the upper chamber 1 until the two pressures equalize at a value which is equal to or less than that prevailing at the discharge end of the delivery tube 5, thereby obviating the flow of a small quantity of liquid from the upper chamber 1 to the sample compartment and the subsequent dispensing thereof during the stage of equalizing pressures.

Alternatively, in an embodiment wherein the stage of dispensing the liquid is separated from the stage of recharging the upper chamber 1, a pressure is applied during the dispensing stage to both chambers 1 and 2 via the side-arm 8 and during the recharging stage side-arms 7 and 8 are connected to sources of relatively high pressure and relatively low pressure respectively. The relatively high pressure maintained in the lower chamber 2 prevents flow of liquid through the orifice 3 during the recharging operation. Subsequently the pressures in the chambers 1 and 2 are equalized thereby allowing liquid to flow through the orifice 3 and the cycle of operations is repeated. Again, the dispensing of a small amount of liquid during the pressure-equalization stage may be avoided by controlling the pressures so that the pressure in the lower chamber 1 always exceeds the pressure in the upper chamber 2 until the two pressures equalize at a value which is equal to or less than that prevailing at the discharge end of the delivery tube 5.

Figure 2:
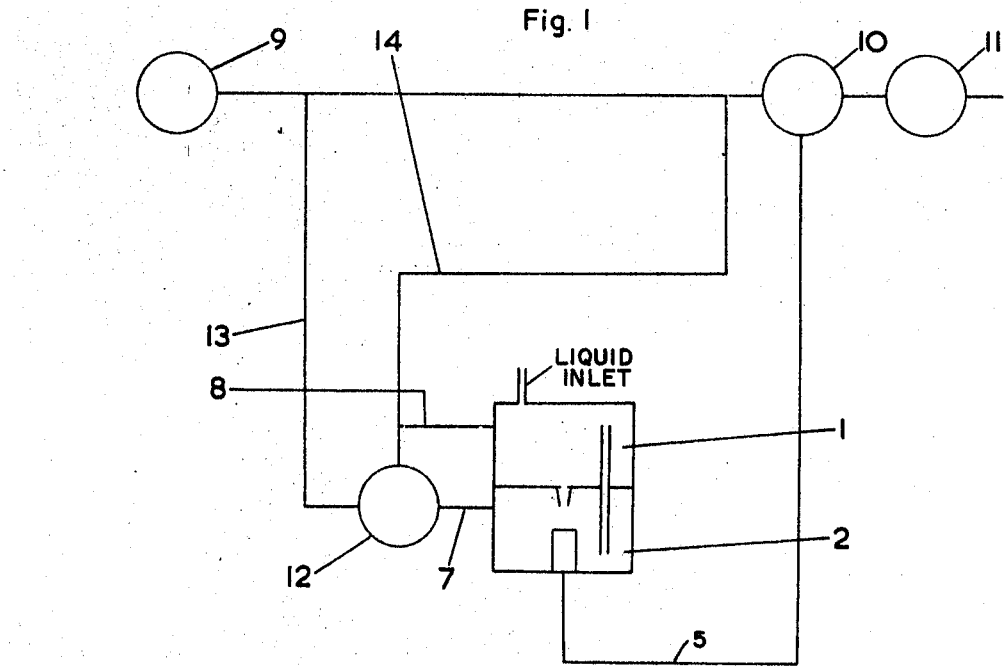
FIGURE 2 is a schematic representation of gas chromatography apparatus incorporating the liquid dispenser of the present invention.

FIGURE 2 is a schematic representation of a gas chromatography apparatus incorporating the liquid dispenser of the present invention. A typical gas-chromatography system involves a supply of inert gas from a source 9 fed to a vaporizer 10 and thence to a detector 11; there is a continuous drop in pressure of the inert gas as it passes from the source 9 to the detector 11. The dispensing apparatus allows a predetermined volume of liquid to be injected into the vaporizer 10 via the delivery tube 5. The inert gas line is connected with the side-arms 7 and 8 through a control valve 12 and gas lines 13 and 14. When a sample is required to be injected into the vaporizer 10, the control valve 12 is actuated, causing inert gas at a relatively high pressure to be applied to the chamber 2, while a relatively low pressure is maintained in the chamber 1. The predetermined volume of liquid is thus injected into vaporizer 10.

Subsequent to the injection of the sample, valve 12 is actuated so as to equalize the pressures in chamber 1 and in the chamber 2 at a pressure corresponding to that in the vicinity of vaporizer 10. This cycle is repeated as frequently as injections are required.

What we claim is:
1. A liquid dispenser comprising the combination of:
   a sample compartment contained within a first chamber, said sample compartment being adapted to be filled with liquid to a predetermined level so that a known volume can be delivered therefrom, and including a delivery outlet in communication with the sample compartment for delivering a volume of liquid from the sample compartment when said first chamber is pressurized,
   a second chamber in communication with the first chamber for delivering liquid to the sample compartment contained within said first chamber,
   a conduit means leading from said first chamber to said second chamber for returning to the second chamber liquid which has overflowed from said sample compartment into said first chamber, and
   means for admitting gas into said first chamber for pressurizing the first chamber so as to dispense a volume of liquid from said sample compartment.

2. The liquid dispenser of claim 1 as included in combination with gas chromatography apparatus of the type which feeds a supply of gas under pressure to a vaporizer and then to a detector, and wherein gas from said supply is admitted to said first chamber at a relatively high pressure and to said second chamber at a relatively low pressure when a liquid sample is to be dispensed from said sample compartment, and wherein said delivery outlet from said sample compartment communicates with said vaporizer for delivering volumes of liquid to the vaporizer when said first chamber is pressurized.

3. A dispenser as claimed in claim 1 and including means for applying pressure to said first and second chambers wherein application within the first chamber of a gas pressure higher than that prevailing in the second chamber serves to dispense liquid from the sample compartment and also serves to recharge the second chamber with liquid overflowed from the sample compartment.

4. A dispenser as claimed in claim 1 wherein means are provided for maintaining a gas pressure within the second chamber at least equal to that in the first chamber during the dispensing of the liquid, the second chamber subsequently being recharged in response to the establishment within the second chamber of a pressure lower than that prevailing in the first chamber.

5. A dispenser as claimed in claim 1 comprising a vessel divided into said first chamber as a lower chamber and said second chamber as an upper chamber, each of the said chambers being adapted to be connected to a source of gas pressure, the lower chamber containing said sample compartment which is provided at its lower end with said delivery outlet for delivering liquid to a point outside the vessel, the sample compartment being filled to a predetermined level by liquid flowing through an orifice from the upper chamber and excess liquid overflowing from the sample compartment into the lower chamber.

References Cited
UNITED STATES PATENTS

| | | | |
|---|---|---|---|
| 400,386 | 3/1889 | Armitstead | 222—318 |
| 692,955 | 2/1902 | Wilcox | 222—373 |
| 2,520,398 | 8/1950 | Hanks | 222—373 |
| 2,846,740 | 8/1958 | Edstrand | 222—373 |
| 2,887,038 | 5/1959 | Rosander | 222—373 |
| 3,129,162 | 4/1964 | Jones | 222—373 |

WALTER SOBIN, Primary Examiner

U.S. Cl. X.R.

222—318, 373